(12) United States Patent
Zami et al.

(10) Patent No.: US 7,539,414 B2
(45) Date of Patent: May 26, 2009

(54) OPTICAL NETWORK WITH A VOID FILLING PROTOCOL INDEPENDENT OF BIT RATE

(75) Inventors: Thierry Zami, Massy (FR); Nicolas Le Sauze, Bures-sur-Yvette (FR); Emmanuel Dotaro, Verrieres le Buisson (FR); Laurent Ciavaglia, Montrouge (FR); Daniel Popa, Malakoff (FR)

(73) Assignee: Alcatel, Paris (FR)

( * ) Notice: Subject to any disclaimer, the term of this patent is extended or adjusted under 35 U.S.C. 154(b) by 436 days.

(21) Appl. No.: 10/885,058

(22) Filed: Jul. 7, 2004

(65) Prior Publication Data

US 2005/0008368 A1    Jan. 13, 2005

(30) Foreign Application Priority Data

Jul. 11, 2003  (FR) .................................. 03 08518

(51) Int. Cl.
*H04J 14/00*    (2006.01)
*H04L 12/43*    (2006.01)
(52) U.S. Cl. ............................. 398/54; 398/51; 370/459
(58) Field of Classification Search ................... 398/51, 398/54; 370/394, 436, 459, 439
See application file for complete search history.

(56) References Cited

U.S. PATENT DOCUMENTS 5,229,993 A       7/1993   Foudriat et al.
6,804,255 B1 *   10/2004   Zheng et al. ................. 370/468
2002/0118420 A1 *  8/2002   Liu ............................. 359/139
2002/0154360 A1   10/2002   Lilu (Continued)

FOREIGN PATENT DOCUMENTS

EP    0462 349 A1    12/1991
EP    1 052 808 A1   11/2000

OTHER PUBLICATIONS

A strict priority scheme for quality-of-service provisioning in optical burst switching networks. Kaheel et al. Computers and Communication, 2003. (ISCC Jun. 30-Jul. 2, 2003). Proceedings. Eighth IEEE International Symposium on. vol. 1, pp. 16-21.*

(Continued)

*Primary Examiner*—Nathan M Curs
(74) *Attorney, Agent, or Firm*—Sughrue Mion, PLLC

(57) ABSTRACT

A communications station (4-*i*) for a WDM ring network is adapted to insert into an optical fiber (2) packets of optical signals carried by at least one wavelength and having a propagation direction in common with at least one other communications station. The station (4-*i*) comprises, firstly, optical detection means (17) adapted to observe the traffic in said optical fiber (2) associated with said common wavelength and to deliver detection signals representative of the absence of packets in the optical fiber (2) at the detected wavelength for a duration exceeding a duration threshold and ii) control means (11) adapted, in the event of reception of a detection signal associated with the detected wavelength to determine the remaining time before the end of the current session, and then to instruct the insertion into the optical fiber (2) of a packet awaiting transmission, at the detected wavelength, if the remaining time before the end of the current session is greater than the time necessary for inserting the packet awaiting transmission into the fiber.

12 Claims, 2 Drawing Sheets

U.S. PATENT DOCUMENTS

2004/0146299 A1* 7/2004 Clapp .................... 398/49
2005/0131940 A1* 6/2005 Le Sauze et al. ......... 707/104.1

OTHER PUBLICATIONS

Le, Sauze N., et. al., "A novel, low cost, optical packet metropolitan ring architecture." ECOC 2001, vol. 6, Sep. 30, 2001, pp. 66-67. XP010582879, Amsterdam.

Kyeong, Soo Kim et al., "Unslotted optical CSMA/CACprotocol with fairness control in metro WDM ring networks," Globecom '02. 2002-IEEE Global Telecommunications Conference, Conference Proceedings. Taipei, Taiwan, Nov. 17-21, 2002, IEEE Global Telecommunications Conference, New York, NY: IEEE, US, vol. 1 of 3, Nov. 17, 2002. pp. 2370-2374, XP010636172.

* cited by examiner

OPTICAL NETWORK WITH A VOID FILLING PROTOCOL INDEPENDENT OF BIT RATE

CROSS-REFERENCE TO RELATED PATENT APPLICATION

This application claims priority from French Patent Application No. 0308518 filed Jul. 11, 2003, in the French Patent Office (Institut national de La Propriete Industrielle), the disclosures of which is incorporated herein in their entirety by reference.

BACKGROUND OF THE INVENTION

1. Field of the Invention

The invention relates to the field of optical networks for transmitting data conveyed over optical connections in the form of optical signals organized into packets.

The invention may be applied in particular to (dense) wavelength division multiplex ((D)WDM) ring networks.

2. Description of the Related Art

Some networks of the above-mentioned type, for example the Dual Bus Optical Ring Network (DBORN), which is a metropolitan access network, comprise communications stations (also known as nodes) coupled to at least one optical fiber adapted to transmit packets of wavelength division multiplexed optical signals and using a void filling protocol to manage the insertion of packets awaiting transmission stored in one of their memories. One such network was the subject matter of the presentation "DBORN: a shared WDM Ethernet bus architecture for optical packet metropolitan networks" given at the Photonics in Switching PiS'2002 Conference, Cheju Island, Korea, Jul. 2002, TuC3.

In the present context the term "void" means an empty space, i.e. one with no packets, within a burst of packets of optical signals.

The above protocol is based on observing the traffic in the transmission optical fiber corresponding to each wavelength, in combination with the use of a delay fiber line inserted into the optical connection.

Observation is generally effected by means of photodiodes each dedicated to one of the working wavelengths of the station concerned and delivering to a monitoring module detection signals that are generally representative of the durations of the voids.

The delay fiber line between the photodiodes and the senders of the station delays the packets in transit for the time needed to process the detection signals.

The processing of the detection signals by the control module consists in determining the duration of the void that has been detected and the associated wavelength, then determining if that duration allows the insertion of one of the packets awaiting transmission, and, if this is the case, organizing the insertion of that packet by the sending module of the station at the wavelength associated with the detected void.

The delay fiber lines equipping the stations of the network have a length chosen to enable the stations to insert the longest packets that the network is able to process. In an Ethernet network, for example, the longest packets comprise around 1500 bytes. A sliding window is therefore created with a duration corresponding to the maximum length of the packets, and this avoids collisions between packets.

The drawback of that type of void filling protocol is that the length of the delay line imposes a maximum packet insertion time that corresponds to a packet size proportional to the transmission bit rate. Consequently, for a given packet size, the lower the bit rate, the longer the fiber delay lines have to be, which can lead to a significant increase in the overall length of the connection and thus increase the cost of the network.

SUMMARY OF THE INVENTION

Thus an object of the invention is to improve on this situation.

To this end the invention proposes a method of transmitting packets in an optical network comprising at least two stations adapted to insert temporally into an optical fiber, between packets in transit sent by at least one other station on their upstream side, packets of optical signals carried by at least one common wavelength and having a common propagation direction, which method is characterized in that it consists in i) sending said stations synchronization signals representative of the beginning of at least one sending session of chosen duration, and ii) authorizing each station during each session to insert a waiting packet at said wavelength into said optical fiber firstly if said station does not detect any packet in transit at that wavelength during a current session for a duration exceeding a chosen threshold duration and secondly if the remaining time between the end of the last packet in transit and the end of the current session is greater than the time necessary for inserting said waiting packet into said optical fiber, and in that insertion begins after a time interval starting from the end of the last packet in transit that is less than said threshold duration.

The internal clock of each station is preferably synchronized to each synchronization signal.

The synchronization signals are preferably sent periodically. The period may then be equal to the duration of a sending session, or more generally equal to n times the duration of a sending session, where n is an integer greater than or equal to 1.

It is useful to define two types of station in the network, or two modes of station operation. The station farthest upstream in said common propagation direction sending packets at said common wavelength is called the master station for that common wavelength. Each other station operating at said common wavelength is then called a slave station for said common wavelength.

Thus, according to another aspect of the invention, it is particularly advantageous if the synchronization signals are sent to the slave stations by the master station.

The invention also provides a communications station (or node) for an optical network, said station being adapted to insert temporally into an optical fiber, between packets in transit sent by at least one other station on its upstream side, packets of optical signals carried by at least one common wavelength and having a common propagation direction.

This communications station is characterized in that it comprises:

i) optical detection means adapted to observe the traffic in said optical fiber associated with said wavelength and to deliver detection signals representative of the absence of packets at said wavelength for a duration exceeding a chosen threshold duration, and ii) control means adapted, in the event of reception of a detection signal after the reception of a synchronization signal representative of the beginning of at least one sending session of chosen duration, to determine the remaining time between the end of the last packet in transit during a current session and the end of that current session, and then to authorize the insertion into said optical fiber of a packet awaiting transmission if said remaining time is greater than the time necessary for inserting the packet awaiting transmission into the optical fiber.

The station further comprises sending means optically coupled to said optical fiber so as to insert a packet awaiting transmission therein on the instructions of said control means, said insertion beginning after a time interval starting from the end of the last packet in transit which is less than said threshold duration.

The station of the invention may have other features, separately or in combination, and in particular:

control means adapted to synchronize an internal clock of the station to each synchronization signal and to deduce the end of a sending session from a synchronization signal, if the station is a master station for the common wavelength it may comprise synchronization means for controlling the sending of synchronization signals to the slave stations, for example signals in the form of dedicated packets; in this case sending is preferably periodic, at a period equal to n times the duration of a sending session, where n is an integer greater than or equal to 1, receiving means optically coupled to the optical fiber upstream or downstream of the detection means and upstream or downstream of the sending means, for extracting packets at each detected wavelength from the fiber, a delay line optically coupled to the optical fiber between the detection means and the sending means, and detection means comprising the same number of photodiodes as there are wavelengths to be detected.

The invention also proposes a ring network, for example a wavelength division multiplex ring network, such as a metropolitan area access network, equipped with at least two communications stations of the type described hereinabove.

BRIEF DESCRIPTION OF THE DRAWINGS

Other features and advantages of the invention will become apparent on examining the following detailed description and the appended drawings, in which.

The appended drawings not only constitute part of the description of the invention but also, if necessary, contribute to the definition of the invention.

DETAILED DESCRIPTION OF EXEMPLARY EMBODIMENTS

The object of the invention is to allow optimized filling of send bursts associated with one or more common wavelengths within a network.

Hereinafter, the network is considered to be a ring network using (dense) Wavelength Division Multiplexing ((D)WDM) like the DBORN telecommunications access metropolitan area network. The invention is not limited to this application, however. It also relates to "shared medium" networks, also known as multiple access networks.

Figure 1:
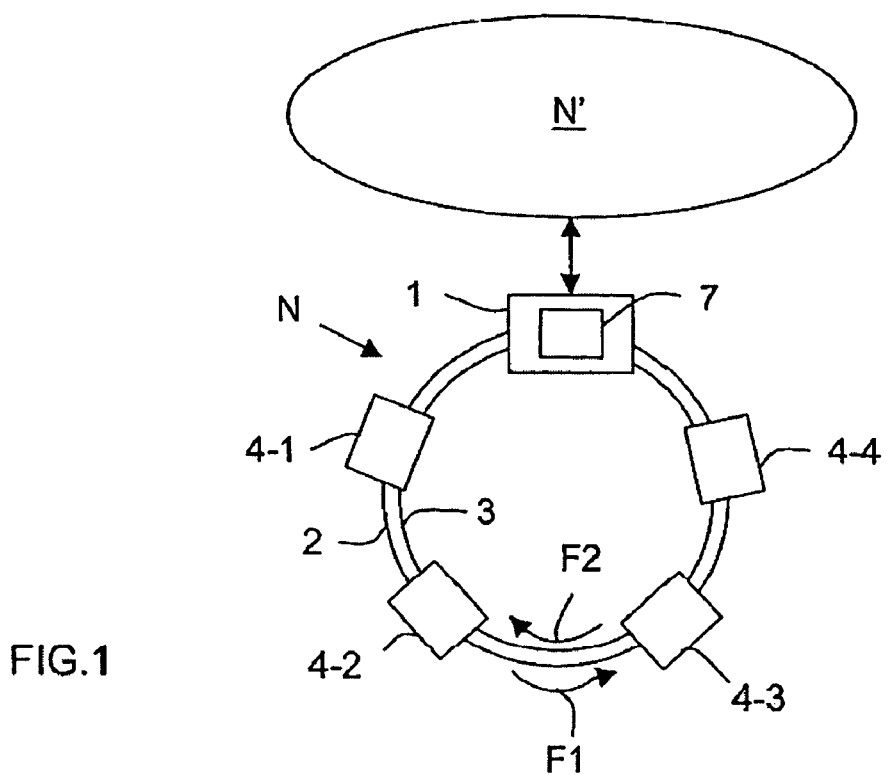
FIG. 1 shows diagrammatically one embodiment of a ring communications network connected to a backbone network.
Figure 2:
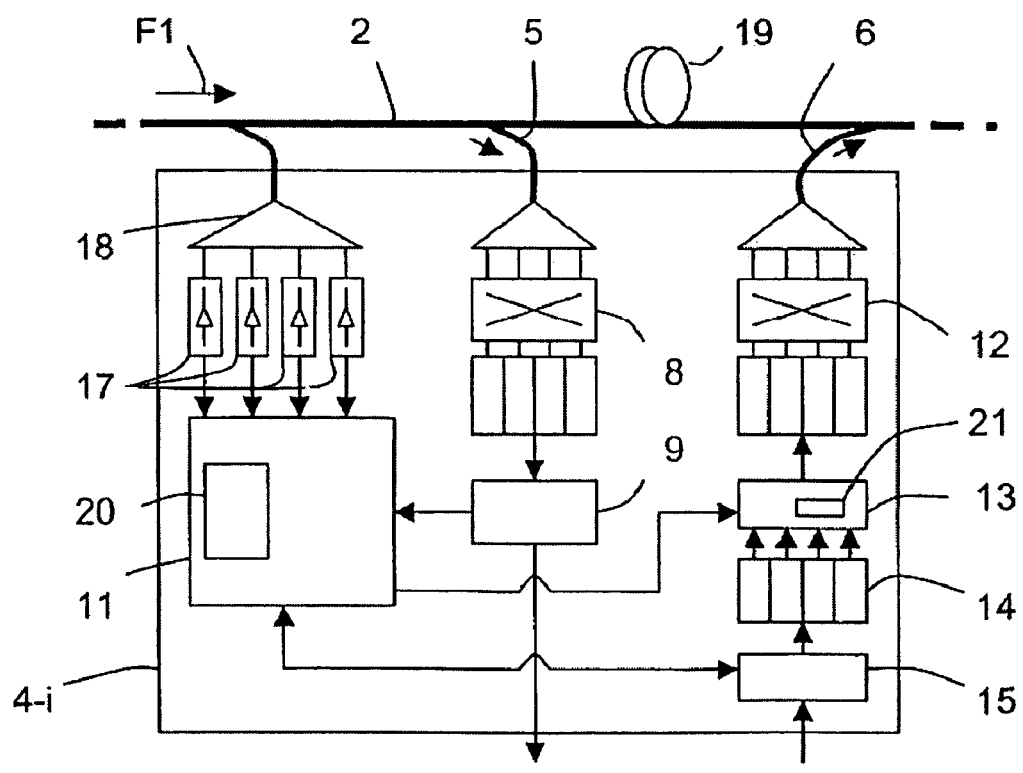
FIG. 2 shows diagrammatically a first embodiment of a communications station of the invention.

The ring network N shown in FIG. 1 comprises, in the conventional way, an access node (also known as a hub or point of presence) 1 to which is connected one or both ends of multiple fibers 2, 3 for transmitting data in the form of optical signals, and a plurality of user stations 4-$i$ (here i=1 to 4 but this number is in no way limited to four and may be any positive integer greater than two (2)), optically coupled to the fibers 2, 3 via coupling means 5, 6 described in more detail later with reference to FIG. 2.

The ring network N is generally connected via the access node 1 to another network N' known as a backbone network.

As mentioned above, the network N preferably comprises a first optical fiber 2 dedicated to uplink traffic from the stations 4-$i$ to the access node 1 (arrow F1) and a second optical fiber 3 dedicated to downlink traffic from the access node 1 to the station 4-$i$ (arrow F2). A simplified network N may nevertheless be envisaged in which there is only one optical fiber dedicated to both traffic types (uplink and downlink). Moreover, having the network N comprise at least one other optical fiber dedicated to protection of the traffic in the event of a breakdown affecting the first and second optical fibers 2 and 3 may also be envisaged.

The access node 1 is preferably electronic and comprises storage means with electronic memories for storing traffic at least temporarily and an Ethernet or Internet Protocol (IP) electronic switch 7 equipped with optical/electrical/optical (O/E/O) converter means so that is able to access all of the traffic circulating in the ring. An electronic switch 7 of this type is generally called a "concentrator".

Remember that in a DBORN type ring network like the network N, the stations 4-$i$ are not able to dialogue with each other directly. If they wish to dialogue with each other, they must first transmit their data (packets of optical signals) via the first fiber 2 to the access node 1, which forwards them to the station concerned via the second fiber 3. Consequently, in this type of ring network, the void filling mechanism of the invention, which is described hereinafter, applies only to the first fiber 2 dedicated to uplink traffic.

A communications station 4-$i$ of the invention is described next with reference to FIG. 2.

In the embodiment shown, the station 4-$i$ is coupled only to the first fiber 2 in order not to overload the connections. However, its coupling to the second fiber 3 (shown in FIG. 1) is substantially identical to that of the first fiber 2. Moreover, it is considered here for illustrative purposes only that the four stations of the FIG. 1 network use the same set of four wavelengths $\lambda 1$ to $\lambda 4$. Of course, this is not necessarily the case. To implement the invention it is in fact necessary for the stations to share at least one common wavelength, in groups of at least two.

The station 4-$i$ comprises firstly a receiving module 8 coupled to the first optical fiber 2 by a 2×1 passive optical coupler 5. Here, the receiving module 8 is a demultiplexer feeding a switch which in turn feeds four receivers each dedicated to one of the four wavelengths. These four receivers are coupled to an extracted packet processing circuit 9 feeding an output 10 which is coupled to a terminal and to a control module 11 of the station 4-$i$ (see below), for example.

The station 4-$i$ further comprises a sending module 12 coupled to the first optical fiber 2 by a 1×2 passive optical coupler 6. Here, the sending module 12 consists of four optical signal sources, for example based on lasers, and delivering carrier waves at four different wavelengths $\lambda 1$ to $\lambda 4$ that are modulated to form the packets of optical signals to be sent over the first fiber 2, a switch fed by the sources, and a multiplexer fed by the switch and feeding the passive coupler 6.

The sources of the sending module 12 are supplied with optical signals by an electronic circuit 13 for reading the contents of memories 14, preferably FIFO memories, at timing rates defined by commands from the control module 11, and adapting the format of the packets read in the memories 14 before communicating them to said light sources. Besides, the memories 14 are fed with packets by a feed module 15 which is itself fed from an input 16 coupled to the above-mentioned terminal, for example, and by the control module 11.

The station 4-$i$ also comprises a detection module consisting here of four detectors 17 each observing the traffic on one of the four wavelengths $\lambda 1$ to $\lambda 4$ in the first optical fiber 2 in order to deliver to the control module 11 detection signals representative of an absence (or presence) of packets in the traffic observed during a period exceeding a threshold period DS. In other words, each detector 17 delivers signals that report a void in the traffic on one of the four wavelengths that it is observing.

Each detector 17 is therefore coupled by a system 18 comprising a 1×2 coupler followed by a wavelength division demultiplexer to the first optical fiber 2, on the upstream side of the passive couplers 5 and 6. Each detector 17 is preferably a photodiode.

Finally, the station 4-$i$ is associated with a delay fiber line 19 that is inserted into the first optical fiber 2 between the two passive couplers 18 and 6 of the detection module 17 and the sending module 12. In the example shown in FIG. 2, the fiber delay line 19 is coupled to the first optical fiber 2 between the two passive couplers 5 and 6 of the receiving module 8 and the sending module 12.

Figure 3:
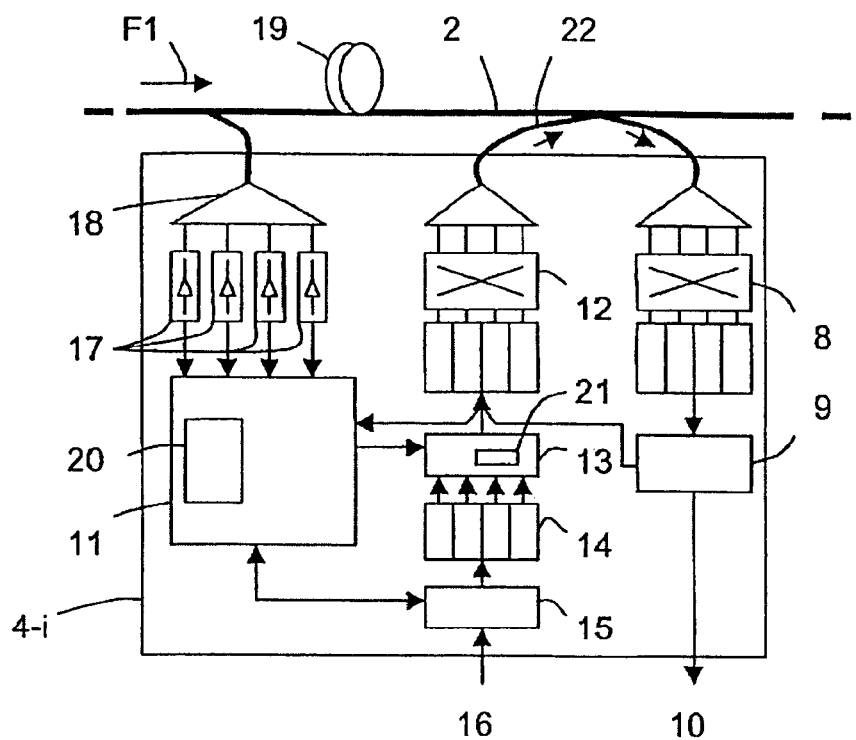
FIG. 3 shows diagrammatically a second embodiment of a communications station of the invention.

In an advantageous embodiment shown in FIG. 3, the sending module 12 and the receiving module 8 are coupled to the first optical fiber 2 by a single 2×2 coupler 22. The fiber delay line 19 is then coupled to the first optical fiber 2 between the two passive couplers 18 and 22.

The fiber delay lines 19 equipping the stations 4-$i$ of the ring network N have a length adapted to the processing time needed by the control module 11 and a threshold period DS but independent of the bit rate of the network, for reasons explained hereinafter.

According to the invention, each wavelength $\lambda 1$ to $\lambda 4$ common to the stations 4-$i$ is associated with a synchronization signal SS$_j$ that is transmitted to said stations over the first optical fiber 2.

The synchronization signals are preferably generated by certain stations called master stations. To be more precise, the master station for a given common wavelength is the station sending packets at this common wavelength in the first fiber 2 the greatest distance upstream of the access node 1. The other stations that are nearer the access node and operate at the common wavelength are then called slave stations for this particular common wavelength.

Thus in the example shown in FIG. 1, the station 4-1 is the master station for the four wavelengths $\lambda 1$ to $\lambda 4$ that are common to the four stations 4-$i$, because it is the one farthest away from the access node 1 for uplink traffic (arrow F1). Thus the stations 4-2, 4-3 and 4-4 in this example are slave stations for the four common wavelengths $\lambda 1$ to $\lambda 4$. Of course, this need not be the case, in particular in a ring network comprising many more stations, in which a plurality of stations may be master stations for different wavelengths and slave stations for other wavelengths.

A synchronization signal SS$_j$ is preferably a dedicated packet injected into the first optical fiber 2 at a common wavelength by the sending module 12 of the station 4-1, which is the master station for this common wavelength. To be more precise, a synchronization module 21 is preferably installed in the electronic circuit 13 to generate (dedicated) synchronization packets that it sends to the sending module 12, indicating the wavelength to be used. This generation of synchronization packets is preferably periodic. It may be synchronized by the control module 11 of the master station 4-1. The period is defined relative to an internal clock (not shown) coupled to the clock timing the master station 4-1.

Figure 4:
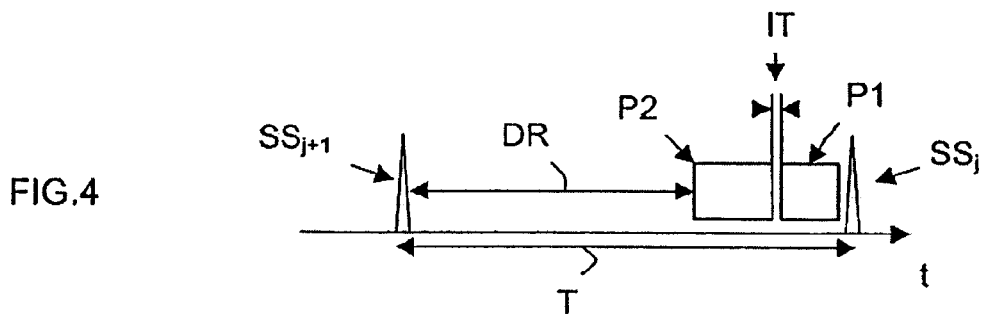
FIG. 4 shows diagrammatically a first example of a burst of packets conforming to the void filling protocol of the invention.
Figure 5:
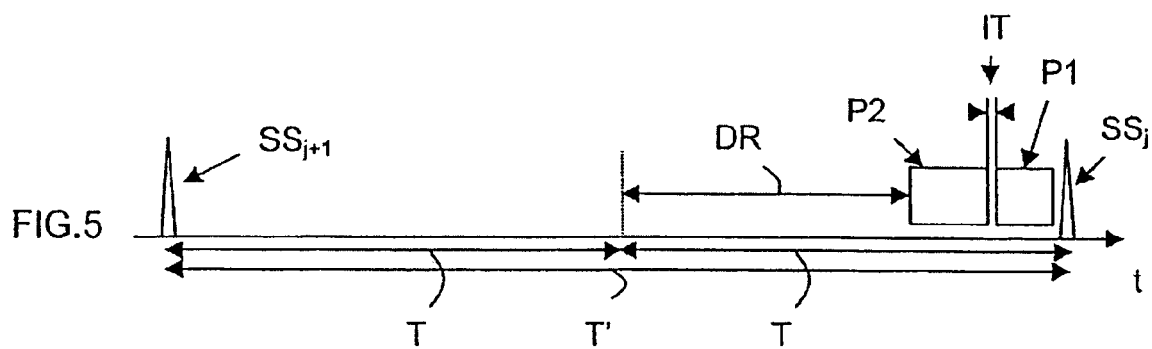
FIG. 5 shows diagrammatically a second example of a burst of packets conforming to the void filling protocol of the invention.

Two types of period may be envisaged: a "simple" period, as shown in FIG. 4, and a "complex" period, as shown in FIG. 5.

A simple period consists in defining for the common wavelength concerned a sending session between two successive synchronization packets SS$_j$ and SS$_{j+2}$ separated by a period T. Here the term "sending session" means a phase of duration T during which each station 4-$i$ operating at the common wavelength concerned may insert a packet awaiting transmission in its memories 14 into the traffic associated with that common wavelength, if it wishes to and is able to. Consequently, a sending session of duration T is associated with a sending burst.

The complex period consists in defining n sending sessions for the common wavelength concerned between two successive synchronization packets SS$_j$ and SS$_{j+1}$ separated by a period T', each sending session having a fixed duration T and n being an integer greater than or equal to two (2). In the example shown in FIG. 5, the period of duration T' between successive synchronization packets is equal to 2 T. In other words, two sending sessions take place here between two successive synchronization packets.

The control module 11 of each station 4-$i$ is configured as a function of the type of period chosen. To be more precise, each control module 11 has a processor module 20 coupled to internal clocks (one for each common wavelength), themselves coupled to the clock timing the station, and storing either only the duration of the period T between two successive synchronization packets SS$_j$ and SS$_{j+1}$ or the duration of the period T' between two successive synchronization packets SS1$_j$ and SS$_{j+1}$, and the sending session duration T.

Each synchronization signal SS$_j$ preferably synchronizes all the internal clocks of the processing modules 20 of the stations 4=i concerned, for one of the wavelengths concerned.

When one of the detectors 17 of one of the slave stations, for example the station 4-4, detects the synchronization packet SS$_j$, it immediately advises the processing module 20 of the control module 11 of this. The control module 11 then synchronizes to that synchronization packet, which advises it of the beginning of the current session. It then awaits detection signals coming from the detector 17.

Nothing happens for as long as the detector 17 observes packets at their detection wavelength. However, if any of the detectors 17 detects a void, i.e. an absence of packet in the sending burst at its detection wavelength, it advises the processing module 20 of this.

By definition, a void corresponds to an observation time with no packet exceeding a chosen threshold duration DS. The threshold duration DS is preferably made less than around 100 nanoseconds (ns) and more preferably less than around 25 ns, for example 20 ns.

This threshold duration DS in fact defines a guard time between successive packets sent on a common wavelength by different stations.

Thus as soon as a detector 17 observes that there is no packet (not dedicated to synchronization) circulating in the first optical fiber 2, at its detection wavelength, for a period greater than the threshold duration DS, it sends a detection signal to the processing module 20. On receiving this detection signal, the processing module 20 deduces from it, given its synchronization, the remaining time DR before the end of the session in progress. It knows when the session in progress began, thanks to the last synchronization signal received, and at what time it received the detection signal, and furthermore knows the duration T of a session.

Knowing precisely the remaining time DR before the end of the current session, the processing module 20 may then deduce therefrom the maximum size of the packet that it may insert into the send burst associated with the current session. Then, in cooperation with the sending electronic circuit 13, it has only to determine whether there exists at the head of the queue in the memories 14 a packet whose size is less than this maximum size, and if so to instruct the sending electronic circuit 13 to extract said packet from the memories 14 and send it to the sending module 12 in order for the latter to insert it into the first optical fiber 2, depending on the wavelength at which a void has been detected, in the sending burst at that wavelength delayed by the fiber delay line 19.

The packet is then inserted into the sending burst of the current session, after the last packet sent by one of the preceding stations, by virtue of a time interval IT less than the threshold duration DS. In the example shown in FIG. 4, before insertion by the station 4-4, the sending burst comprises a first packet P1 inserted by the first station 4-1, for example, just after the synchronization packet $SS_j$ and a second packet P2 inserted by the third station 4-3, for example, just after the first packet P1. Consequently, the fourth station 4-4 may insert its packet after the second packet P2.

The processing module 20 and the synchronization module 21 of the invention may take the form of electronic circuits, software (or data processing) modules, or a combination of circuits and software.

The invention also provides a packet transmission method applicable within a wavelength division multiplex optical ring network N.

The method may in particular be executed by the ring network N and the communications stations 4-i described hereinabove. The main and optical functions and sub-functions of the steps of the method being substantially identical to those of the ring constituting the network N and/or the communications stations 4-i, there are summarized hereinafter only the steps implementing the main functions of the method of the invention.

That method consists first of all in sending the stations 4-i synchronization signals, for example in the form of dedicated packets, representative of the beginning of at least one sending session of chosen duration T, and then allowing each station 4-i, during a current session, to insert a packet awaiting transmission into the optical fiber 2, at the common wavelength, firstly if the station 4-i does not detect any packet at that common wavelength during a current session duration exceeding a chosen threshold duration DS, and secondly if the remaining time DR before the end of the current session is greater than the duration necessary for inserting the waiting packet into the fiber 2.

If insertion is effective, it begins after a time interval IT starting from the end of the last packet in transit, that must be less than the threshold duration DS. This guarantees that the same method may be applied for each downstream station.

The invention is not limited to the embodiments of communications stations, ring networks and transmission methods described hereinabove by way of example only, and encompasses any variants within the scope of the following claims that the person skilled in the art might envisage.

Thus the foregoing description relates to a ring network in which the synchronization signals relating to the traffic at a given wavelength are generated by the station that is the master station for that wavelength. However, it may envisaged that the network comprise an equipment dedicated to synchronization and placed on the upstream side of the most upstream station relative to the access node. In this case, none of the stations has a synchronization module, meaning that the distinction between master and slave stations no longer applies.

As a general rule, the method and the station of the invention may be applied to any type of network in which at least one optical connection is coupled to sending stations distributed along the connection, those stations being adapted to insert packets among packets in transit sent by stations on their upstream side and in a common propagation direction.

What is claimed is:

1. A method of transmitting packets in an optical network comprising at least two stations adapted to insert temporally into an optical fiber, between packets in transit sent by at least one first station of said stations on their upstream side, packets of optical signals carried by at least one common wavelength and having a common propagation direction, the method comprising:

sending to at least one second station of said stations a synchronization signal indicative of beginning of an at least one sending session; and authorizing a sending unit of the at least one second station during a current session of the at least one sending session indicated by the synchronization signal to insert a waiting packet at said wavelength into said optical fiber, if an optical detection unit of the at least one second station does not detect any packet in transit at said wavelength during the current session for a duration exceeding a threshold duration, and if a remaining time between an end of a last packet in transit and an end of the current session is greater than a time necessary for inserting said waiting packet into said optical fiber, wherein the second station comprises a first coupler coupling the optical detection unit to the optical fiber and a second coupler coupling the sending unit to the optical fiber, wherein a propagation delay of the packets in transit in the optical fiber between the first and second couplers is larger than said threshold duration, wherein the insertion begins so that the inserted packet follows the last packet in transit in the optical fiber by a time interval starting from the end of the last packet in transit that is less than said threshold duration, and the insertion is performed independent of data bit rate of the optical network.

2. A method according to claim 1, wherein an internal clock of the at least one second station is synchronized to the synchronization signal.

3. A method according to claim 1, wherein the at least one second station is sent the synchronization signal periodically at a period that is equal to n times a duration of the at least one sending session, where n is an integer greater than or equal to 1.

4. A method according to claim 1, wherein a station of said stations positioned farthest upstream in said common propagation direction sending the packets at said common wavelength is called a master station for that common wavelength, and another station of said stations operating at said common wavelength is called a slave station for said common wavelength, and wherein the synchronization signal is sent to said slave station by said master station.

5. A method according to claim 1, wherein said synchronization signal is a dedicated packet.

6. A communications station for an optical network, said station being adapted to insert temporally into an optical fiber, between packets in transit sent by at least one station on its upstream side, packets of optical signals carried by at least one common wavelength and having a common propagation direction, the communications station comprising:

a control unit adapted to receive a synchronization signal indicative of beginning of at least one sending session, an optical detection unit coupled to the optical fiber by a first coupler and adapted to observe traffic in the optical fiber associated with said wavelength and to deliver a detection signal indicative of absence of a packet at said wavelength during a current session of the at least one sending session indicated by the synchronization signal for a duration exceeding a threshold duration;

wherein the control unit is adapted, in the event of reception of the detection signal after reception of the synchronization signal, to determine a remaining time between an end of a last packet in transit and an end of the current session and to authorize insertion into the optical fiber of a packet awaiting transmission, if said remaining time is greater than a time necessary for inserting the packet awaiting transmission into the optical fiber; and a sending unit optically coupled to the optical fiber by a second coupler so as to insert the packet awaiting transmission on an instruction of said control unit, wherein a propagation delay of the packets in transit in the optical fiber between the first and second couplers is larger than said threshold duration, wherein the insertion begins so that the inserted packet follows the last packet in transit in the optical fiber by a time interval starting from the end of the last packet in transit which is less than said threshold duration, and the insertion is performed independent of data bit rate of the optical network.

7. A station according to claim 6, wherein said control unit is adapted to synchronize an internal clock of the communication station to the synchronization signal, and to deduce an end of the at least one sending session from the synchronization signal.

8. A station according to claim 6, wherein a station of the at least one station positioned farthest upstream in said common propagation direction sending the packets at said common wavelength is called a master station for that common wavelength and another station operating at that common wavelength is called a slave station for said common wavelength, and wherein the master station comprises a synchronization unit adapted to manage sending the synchronization signal to said slave station.

9. A station according to claim 8, wherein said synchronization unit is adapted to send the synchronization signal periodically at a period that is equal to n times a duration of the at least one sending session, where n is an integer greater than or equal to 1.

10. A station according to claim 8, wherein said synchronization unit is adapted to send said synchronization signal in the form a dedicated packet.

11. A station according to claim 6, further comprising a fiber delay line optically coupled to said optical fiber between said first and second couplers.

12. A ring optical network comprising:

an access node; and at least two communication stations, wherein each of the two communication stations is a communication station according to claim 6, and coupled to at least one optical fiber.

* * * * *